UNITED STATES PATENT OFFICE.

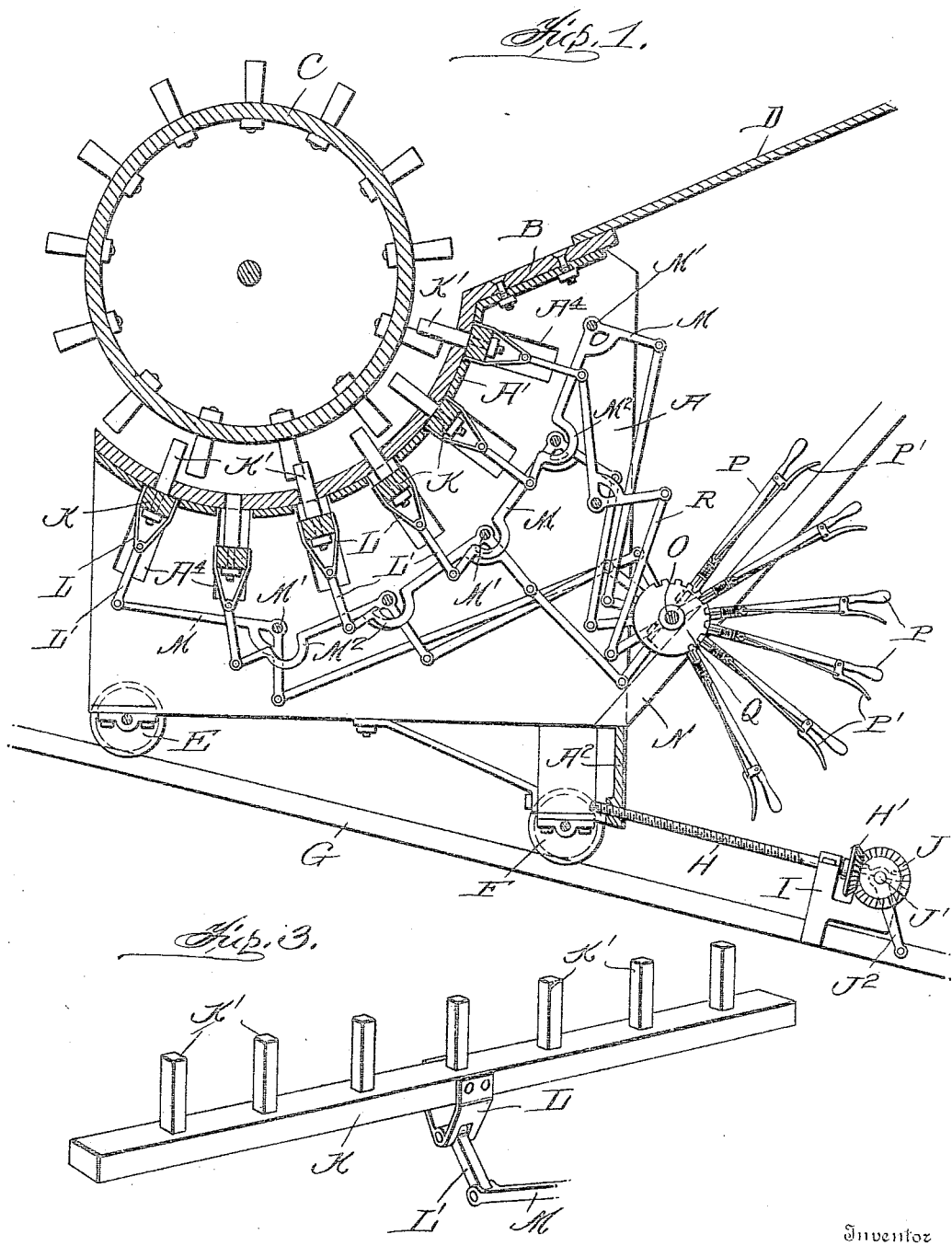

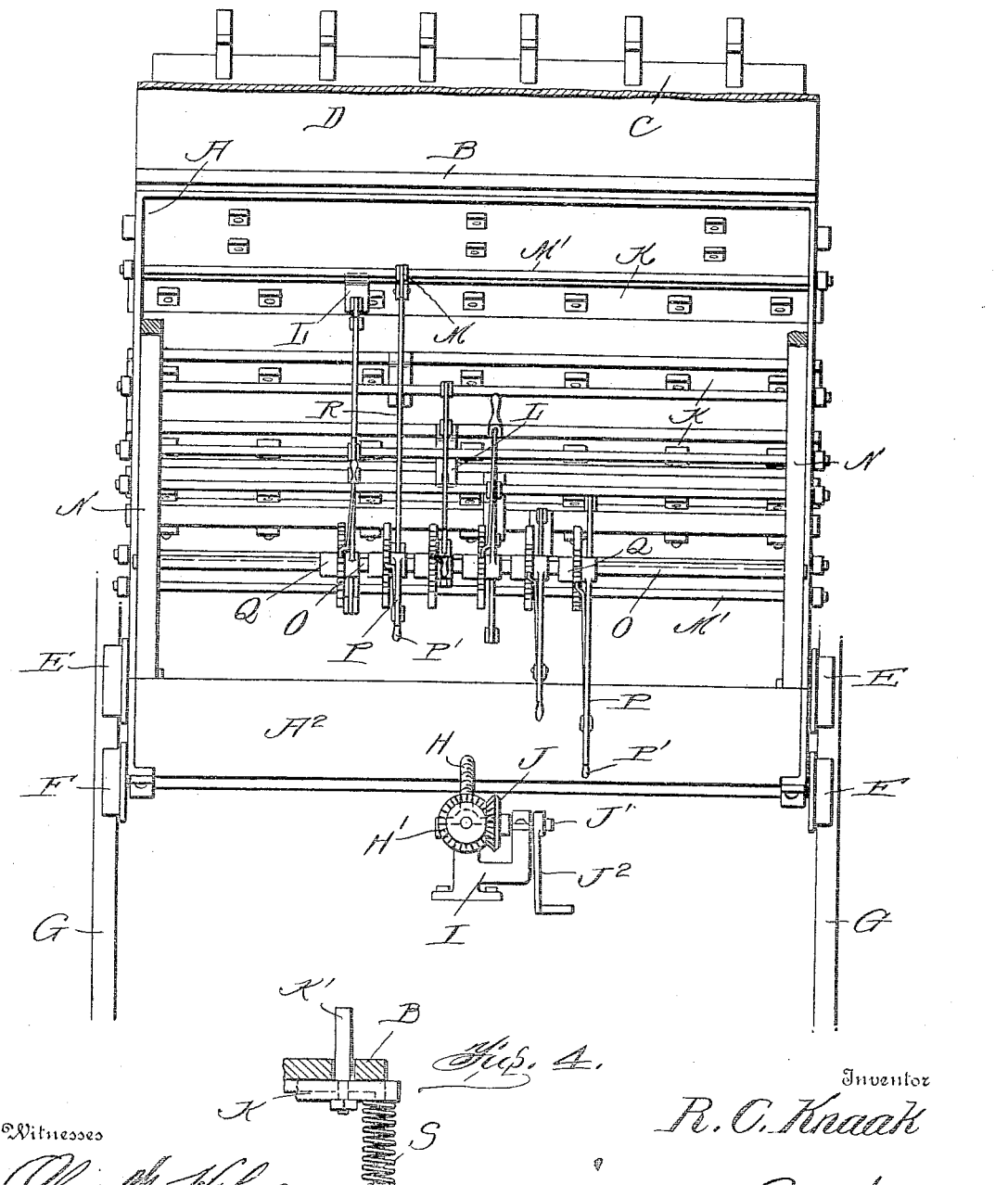

ROBERT C. KNAAK, OF HARTSBURG, ILLINOIS.

CONCAVE ATTACHMENT FOR THRESHING-MACHINES.

953,845.     Specification of Letters Patent.     Patented Apr. 5, 1910.

Application filed March 11, 1909. Serial No. 482,867.

*To all whom it may concern:*

Be it known that I, ROBERT C. KNAAK, a citizen of the United States, residing at Hartsburg, in the county of Logan and State of Illinois, have invented a new and useful Improvement in Concave Attachments for Threshing-Machines, of which the following is a specification.

This invention relates to adjustable concaves for threshing machines, the object being to provide a concave which can be moved in respect to the threshing cylinder so as to overcome the difficulties now existing of the threshing machine choking up.

A further object of my invention is to provide a concave with adjustable teeth whereby the rapidity of the threshing can be increased or decreased.

A still further object of my invention is to provide novel means for adjusting the teeth of the concave whereby any number of sets of the same can be adjusted independently by simply operating a lever.

A still further object of my invention is to provide a casting which carries a concave, said casting being provided with wheels mounted on an inclined track so that by moving the casting the concave will be adjusted in respect to the cylinder.

A still further object of the invention is to provide novel means for connecting the toothed bars of the concave to links which are carried by cranks whereby any one of the same can be readily replaced if the same should become accidentally broken.

A still further object of my invention is to provide an adjustable concave for threshing machines which is exceedingly simple and cheap in construction and one which is composed of a few parts which are so arranged and connected together that any one of the parts can be readily detached without stopping the machine.

A still further object of my invention is to provide novel means for adjusting the casting carrying the concave, said means comprising a screw adapted to be operated by a crank.

With these objects in view, my invention consists of the novel features of construction, combination and arrangement of parts hereinafter fully described, pointed out in the claims and shown in the accompanying drawings, in which, Figure 1 is a vertical section through my improved concave. Fig. 2 is a front view of the same. Fig. 3 is a perspective view of one of the toothed bars showing the manner of connecting the link thereto. Fig. 4 is a detail view of a modified form of mounting the toothed bars.

In carrying out my improved invention, I employ a casting A which is provided with a concave portion A' to which is connected the concave B which is arranged under the threshing cylinder C of the threshing machine and secured to the upper end of the concave B is a chute D over which the material to be threshed passes to the cylinder. The casting is provided with wheels E and F arranged in different horizontal planes and mounted on inclined tracks G which are mounted on the threshing machine and the casting is also provided with a cross bar $A^2$ having a threaded bore in which works a screw H mounted in a bracket I and having a bevel gear H' fixed on one end meshing with a bevel gear J carried by a shaft J' which is provided with a crank $J^2$ for operating the same and it will be seen that as the screw is rotated the casting carrying the concave will be moved in respect to the cylinder. It will be seen that by this arrangement if the machine becomes choked by the straw it is only necessary to move the concave away from the cylinder so as to allow the same to pass therethrough.

The sides of the casting A are provided with slots $A^4$ in which are mounted toothed bars K provided with teeth K' which work through slots formed in the concave portion of the casting and the concave B and adapted to co-act with the teeth of the threshing cylinder in the usual manner. Secured over each of the toothed bars K is a yoke L carrying a pivoted link L' which is adapted to be connected to cranks M mounted on shafts M' which are journaled in the sides of the casting, said cranks being provided with bowed portions $M^2$ so as to prevent the cranks from engaging the shaft and it will be seen that for operating the cranks the toothed bars will be moved in the slots of the casting so as to adjust their position in the concave.

Extending out to the rear of the casting are arms N in which is a shaft O carrying a plurality of levers P provided with hand levers P' which work in connection with segmental racks Q fixed on the shaft between the respective levers and connected to each of the levers is a link R which is connected to the respective cranks so that as the levers are operated the cranks will be swung so as to move the toothed bars in and out of the concave whereby the rapidity of the threshing can be regulated. It will be seen that by this construction each one of the toothed bars can be easily and quickly adjusted for operating a lever so that if desired some of the toothed bars can be moved into such a position that the teeth will be drawn flush with the concave.

While I have shown and described the toothed bars mounted in slots and operated by peculiar shaped crank arms it is of course understood that various other means could be used to operate the same without departing from the spirit of my invention.

In the modification shown in Fig. 4 I arrange coiled springs S in the slots of the casting of the concave under the toothed bars for holding the same in their adjusted position so that the teeth will be held within the concave evenly and it will be seen that by this arrangement the toothed bars work against the tension of the springs when moved inwardly.

From the foregoing description it will be seen that I have provided an adjustable concave for threshing machines which can be moved in respect to the threshing cylinder and at the same time is provided with adjustable toothed bars which can be operated independently which enables the operator to adjust the same easily and quickly.

What I claim is:—

1. In a threshing machine, the combination with a threshing cylinder, of a casting carrying a concave slidably mounted under said cylinder provided with adjustable teeth, said casting being provided with a threaded bore and a screw working in said threaded bore for adjusting said concave with respect to the threshing cylinder.

2. An adjustable concave for threshing machines comprising a casting provided with wheels mounted on an inclined track said casting being provided with slots, a plurality of toothed bars working in said slots, a concave provided with slots arranged over said casting through which said teeth work, and means for adjusting said toothed bars independently, together with means for moving said casting in respect to the cylinder.

3. In a threshing machine the combination with a threshing cylinder, an inclined track arranged under said cylinder, a casting provided with wheels mounted on said track, a concave carried by said casting, toothed bars slidably mounted within the casting provided with teeth extending through said concave, yokes carried by said bars, links carried by said yokes, cranks connected to said links, and levers carrying links connected to said cranks for operating the same, together with means for moving said casting on said track.

4. In a threshing machine, the combination with a threshing cylinder, of an inclined track arranged under said cylinder, a concave carried by said casting, wheels carried by the casting mounted on said track, a cross bar connecting the lower end of said casting provided with a threaded bore, a screw working in said threaded bore carrying a bevel gear, a second bevel gear meshing with said gear, and a crank carried by the shaft carrying the second bevel gear for operating the same, whereby said casting can be moved in respect to the cylinder.

5. In a threshing machine the combination with a threshing cylinder, of an inclined track arranged under said cylinder a casting provided with wheels mounted on said track, a concave carried by said casting, means for moving said casting on said track, slidably mounted toothed bars mounted in the casting provided with teeth extending through the concave, and levers and cranks for operating said toothed bars.

6. In a threshing machine, the combination with a threshing cylinder, of a casting slidably mounted under said cylinder, provided with a concave portion, a concave arranged over said concave portion of the casting provided with slots, slidably mounted toothed bars carried by the casting provided with teeth extending through the slots of the concave, yokes carried by said bars, links carried by said yokes, shafts carrying cranks mounted in the casting connected to the respective links, and a plurality of levers each carrying a link connected to the respective cranks whereby said toothed bars can be operated independently.

ROBERT C. KNAAK.

Witnesses:
H. P. JONES,
EDWARD E. HALL.